United States Patent

Virkkala

[11] Patent Number: 5,839,990
[45] Date of Patent: Nov. 24, 1998

[54] APPARATUS FOR CONNECTING AN EXERCISE BICYCLE TO A COMPUTER

[76] Inventor: Antero J. Virkkala, Pyörätie 14B, FIN-01280 Vantaa, Finland

[21] Appl. No.: 710,244

[22] Filed: Sep. 13, 1996

Related U.S. Application Data

[63] Continuation of PCT/FI95/00137 Mar. 14, 1995 published as WO94/16777 Apr. 8, 1994.

[30] Foreign Application Priority Data

Apr. 14, 1994 [FI] Finland .................................. 941202

[51] Int. Cl.⁶ .................................................. A63B 69/00
[52] U.S. Cl. .................................. 482/8; 434/247; 482/1; 482/4; 482/7; 482/902; 273/148; 463/38
[58] Field of Search ............................ 434/247; 482/1–9, 482/51–54, 57–60, 62–65, 70, 71–73, 900–902; 345/161–163; 273/148; 463/47, 38; 601/23, 26, 33–36

[56] References Cited

U.S. PATENT DOCUMENTS

| | | | |
|---|---|---|---|
| 4,512,566 | 4/1985 | Bicocchi | 482/2 |
| 4,512,567 | 4/1985 | Phillips | 482/2 |
| 4,976,435 | 12/1990 | Shatford et al. | 492/902 |
| 5,362,069 | 11/1994 | Hall-Tipping | 482/902 |

*Primary Examiner*—Glenn E. Richman
*Attorney, Agent, or Firm*—IP Group of Pillsbury Madison & Sutro LLP

[57] ABSTRACT

A device for connecting fitness equipment such as an exercise bicycle to a computer equipped with a game control device including a continuously variable resistance (e.g. industry standard architecture computers such as IBM PC/AT and compatibles equipped with a joystick adapter). The two states of the exercise bicycle (pedaling or not pedaling) are converted to the three states required by racing simulations (braking, coasting, accelerating) by means of a non-linear element in such a way that pedaling at speeds lower than a certain cross-over value is converted to various degrees of braking while pedaling at speeds higher than this value is converted to various degrees of acceleration. The cross-over pedaling speed which is converted to a resistance equal to that of a joystick in its middle position is lower than half the maximum speed. Within the range of possible pedaling speeds of the exercise bicycle, a smaller portion is used for braking and a greater portion is used for accelerating.

13 Claims, 2 Drawing Sheets

APPARATUS FOR CONNECTING AN EXERCISE BICYCLE TO A COMPUTER

This application is a continuation of PCT application FI95/00137 which is based on a Finnish priority application 941202, filed Mar. 14th, 1994.

FIELD OF THE INVENTION

The present invention relates to computer systems and exercise equipment, such as an exercise bicycle. More particularly, it relates to maintaining motivation during a fitness session by allowing the user to play computer games and control the speed of a character in the game, such as a car or an aircraft by varying the rate of exercise, such as pedaling speed.

DESCRIPTION OF THE PRIOR ART

Exercise aimed at improving physical fitness must be continuous for at least 15 minutes and must be performed regularly. One way to maintain motivation is to combine fitness equipment, such as an exercise bicycle, treadmill, or rowing equipment, with a computer or a game console and thus make exercising more pleasant. In spite of numerous earlier patents and applications, such products are not available in sports, fitness, or computer shops. Neither are they being advertised in trade magazines. Solutions of the following types have been presented in earlier patents and applications:

1. A video recorder or a film projector displaying film at a speed proportional to the pedaling speed, such as DE 3210899 (Ehinger) and U.S. Pat. No. 4,278,095 (Lapeyre). The equipment is expensive, bulky and unfit for other purposes. The motivation created by the competitive environment is absent.

2. A combination of an exercise bicycle and a game computer, only suitable for playing. Examples: EP 255142 (Nobuta), WO 9216267 (Atari), DE 3218086 (Schleicher), DE 3404539 (Stel), DE (3408303 (Schwegler) and U.S. Pat. No. 4,556,216 (Pitkanen). These devices are also expensive, bulky and unfit for other purposes. Software support is limited because software has to be written for these devices individually.

3. An interface to game consoles using racing games. It is difficult to connect an exercise bicycle to a game console in such a way that the pedaling speed controls the outcome of the game (e.g. the steering of the car) in a continuously variable fashion. The reason for this is that the most natural connecting port of game consoles—the joystick adapter—only senses the cardinal and diagonal compass points of the joystick as on/off states, in addition to the neutral position. This is why game consoles lack realistic racing simulations that obey the laws of physics. A complex solution for entering at least a few discrete speed values has been presented in publication WO 9209347 (Shatford). There, a microprocessor measures pedaling speeds and feeds up or down pulses into the joystick adapter depending on whether the car in the game should be sped up or slowed down.

4. An interface to game consoles using any kind of game software. U.S. Pat. No. 4,512,567 (Phillips) and U.S. Pat. No. 4,637,605 (Ritchie) describe equipment that allow playing any video games using the handlebars of the exercise bicycle as long as the bicycle is being pedaled fast enough. There is no further connection from pedaling to playing.

5. An interface to an existing computer. Patent GB 2,114, 901 (Bannister) describes a counter that measures the pedaling speed as a 4-bit value but the patent does not disclose which computer and which piece of software would accept this 4-bit value as input. Patent U.S. Pat. No. 4,824,111 (Hoye) describes equipment that replaces the keyboard of the computer.

None of the above patents describes an interface to an industry standard architecture computer or any computer wherein the game control device comprises two continuously variable resistances, one for horizontal, one for vertical control. U.S. Pat. No. 4,512,567 (Phillips) does mention (column 3, line 10) that the " . . . inputs are designed to receive a variable resistance" but on line 40 it says that " . . . this DC voltage is applied to one paddle input of the computer . . . " The joystick adapters of industry standard architecture computers are designed to respond to a resistance, not to a voltage.

Regardless of how well the earlier inventions perform in their intended environment, none of them is suitable if the user wishes to employ an exercise bicycle for controlling existing game software running in an existing industry standard architecture computer.

Athletes perform at their best in competitive situations. Likewise, with an exercise bicycle, chasing the car ahead creates a stronger motivation than a simple numerical result, e.g. a distance covered in a certain time. The best motivation is achieved when the user is enabled to control a realistic racing simulation with an exercise bicycle. Racing against human or computer-controlled opponents places exacting requirements on the steering ability of the system. If one enters a competition, one must also have a chance to succeed. The driving sensation must be as good as or better than that achieved with the best available joysticks.

Little attention has been paid to a crucial difference between an exercise bicycle and a real bicycle: with an exercise bicycle, it is not possible to distinguish between free coasting and active braking. Equipment comprising dedicated hardware and custom software can make the racecar run at a speed proportional to the pedaling speed. This is not possible with existing hardware and software because, in existing games, the joystick does not control the speed of the racecar directly. Instead, the joystick functions as a combined accelerator/brake pedal. Pushing the joystick forward from its middle position is equivalent to accelerating and pulling the joystick backwards is equivalent to braking. One half of the whole range of possible joystick positions is used for acceleration and the other half for braking. How should the interface convert pedaling speeds to apparent joystick positions? What is the equivalence of the state where no pedaling occurs? Is it equivalent to free coasting or maximum braking?

If non-pedaling is converted to maximum braking and the signal is handled in a linear fashion, the exercise bicycle must be pedaled at half the maximum speed before the game software detects that the user has stopped braking and started at least a slow acceleration. This is unrealistic and detracts from the driving pleasure. This situation is represented by line A in FIG. 2. The y-axis (the resistance of the joystick versus speed) is shown upside down because a smaller resistance is equivalent to a higher speed and vice versa.

If non-pedaling the bicycle is equivalent to the middle position of the joystick, how can one slow down the racecar? This situation is described by curve B in FIG. 2. A separate brake should be included. This would be difficult for the users to learn: even when the bicycle is idle, an electronic brake is needed to slow down the racecar. This electronic brake would become rather complex, since a simple on/off switch is not sufficient. The best racing simulations are so realistic that when full braking power is applied at a high speed the wheels become locked, causing the car to spin out of the racetrack. Pedaling backwards is not a good solution either. Some exercise bicycles can not be pedaled backwards. Furthermore, the speed sensor should be capable of distinguishing between two directions of rotation.

SUMMARY OF THE INVENTION

In the present invention, the problem has been solved by using a non-linear element: not pedaling the bicycle is equivalent to pulling the joystick all the way back, i.e. maximum braking, but the signal is handled in a strongly non-linear way. This situation is represented by curve C in FIG. 2. Pedaling speeds lower than a certain cross-over value are converted to various degrees of braking while pedaling speeds higher than this cross-over value are converted to various degrees of acceleration. The cross-over value which is converted to an apparent middle position of the joystick is markedly lower than half the maximum pedaling speed.

The preferred embodiments of the inventive system are characterized by what is recited in the attached claims.

DETAILED DESCRIPTION OF THE PREFERRED EMBODIMENT

Figure 1:
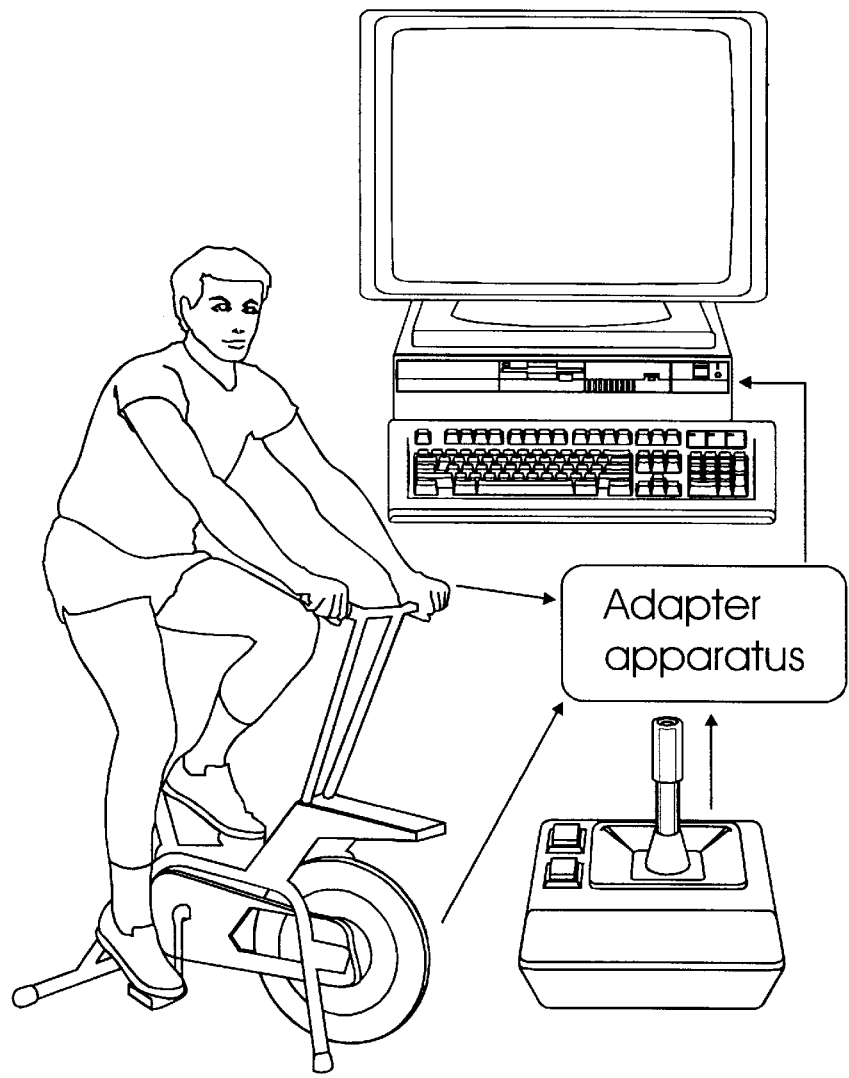
FIG. 1 represents the present invention in relation to a computer and an exercise bicycle.
Figure 2:
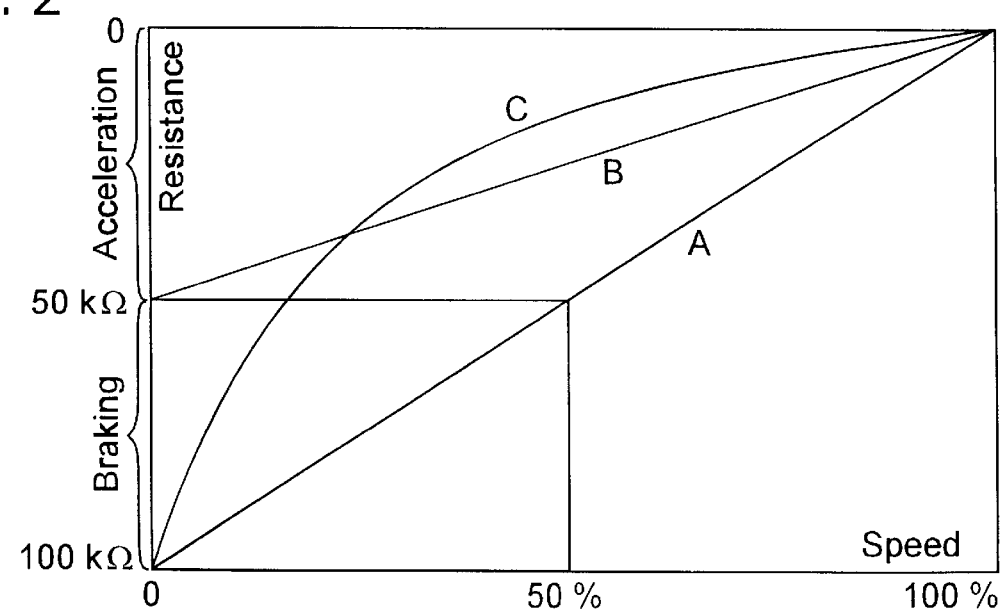
FIG. 2 shows three possible ways to convert pedaling speeds to equivalent joystick positions.

FIG. 1 illustrates how the apparatus is connected to an exercising bicycle. A pulse sensor is mounted next to the flywheel and a pair of steering switches are mounted on the handlebar. The apparatus is connected to the joystick port of the computer.

Figure 3:
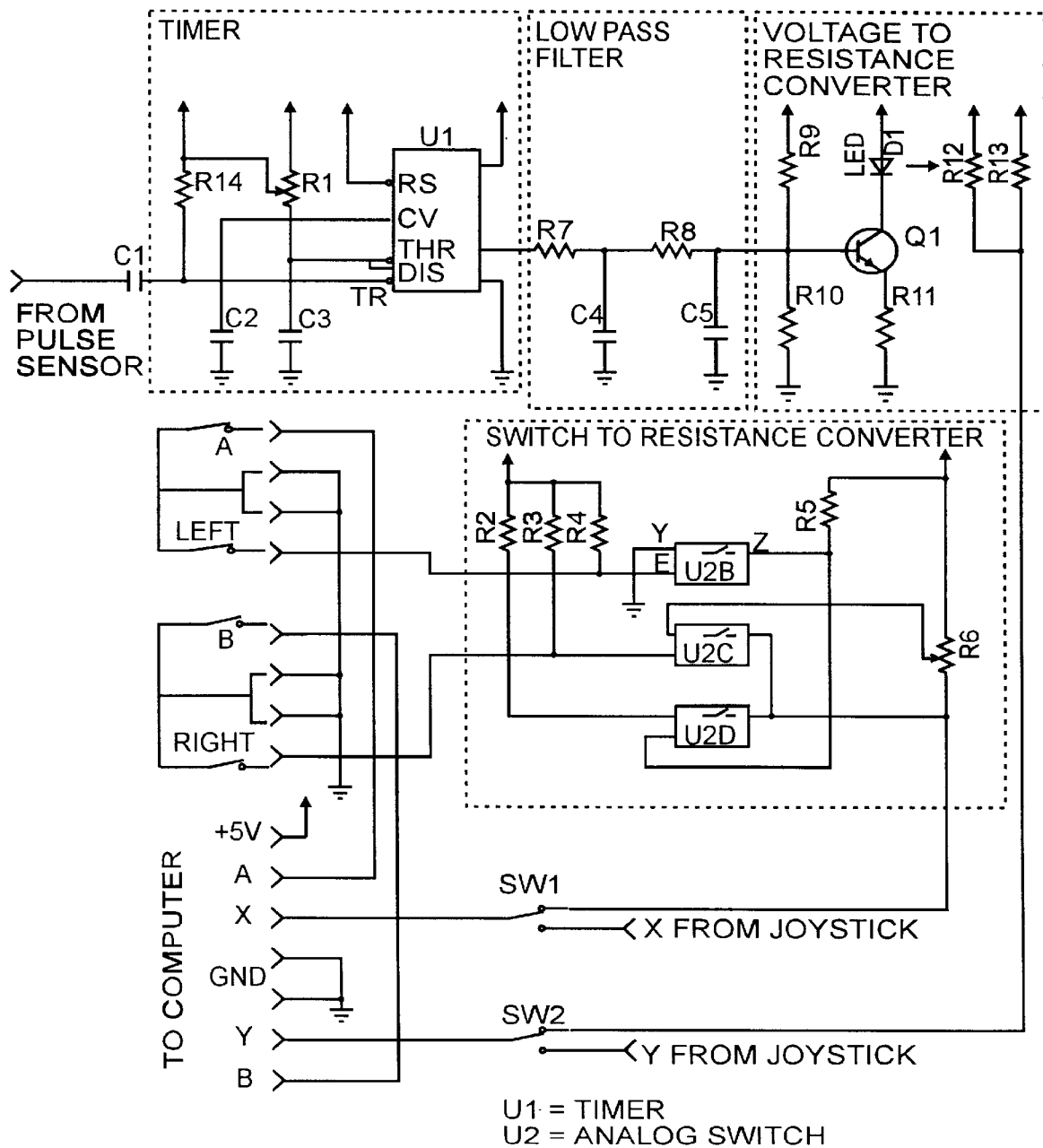
FIG. 3 shows an exemplary embodiment of the present invention.

FIG. 3 shows the core of the apparatus, comprising:

Interfaces to the computer, external joystick, pulse sensor and steering switches.

A speed-to-resistance converter that converts the two states of the exercise bicycle (pedaling or not pedaling) to the three states required by racing simulations (braking, coasting, acceleration) without a separate brake. Instead, a non-linear element is used in such a way that pedaling speeds lower than a certain cross-over value are converted to various degrees of braking while pedaling speeds higher than this cross-over value are converted to various degrees of acceleration. The cross-over value which is equivalent to the apparent middle position of the joystick is markedly lower than half the maximum pedaling speed. Within the range of possible pedaling speeds of the exercise bicycle, a smaller portion is used for braking and a greater portion is used for accelerating. With this method, a highly enhanced driving feel is achieved which helps to maintain motivation. The speed-to-resistance converter comprises a pulse sensor, timer circuit, low-pass filter, LED (or another kind of a lamp) and a light dependent resistor.

A switch-to-resistance converter converting a left steering input to a resistance equal to that of a joystick tilted left and converting a right steering input to a resistance equal to that of a joystick tilted right. The switch signals are converted in such a way that the computer is prevented at all times from detecting an apparent resistance greater than the maximum resistance of an ordinary joystick. Should this happen, it would confuse the joystick calibration of many games. In addition to the steering switches, switches A and B are mounted on the handgrips, just like in an ordinary joystick. These switches can be used for shifting to a higher or a lower gear, choosing game options, etc.

Selection switches, enabling the user to separately select both x and y axis control from either the exercise bicycle or an external joystick. An external joystick is needed for choosing between game options and calibrating the joystick.

The electronic implementation of the invention is shown in FIG. 3. A Hall-effect sensor outputs pulses when magnets mounted on a rotational member of the exercise bicycle pass under the sensor. With 4 magnets, the sensor outputs 4 pulses per revolution. The pulse input is connected to timer U1. The constant-duration output pulses of U1 are filtered through a low-pass filter R7-8, C4-5. Transistor Q1 drives LED D1 which illuminates light dependent resistor R12. The resistance of this LDR is inversely proportional to the illumination intensity, i.e. approximately inversely proportional to the pedaling speed. Resistor R13 is used to match the resistance of the combination R12-13 to the maximum resistance of a joystick when LED D1 is off (the exercise bicycle is idle).

Switch SW2 is used for selecting whether the resistance of the combination R12–13 or the resistance of an external joystick is connected to the computer. The latter position is used for choosing between game options.

A continuously variable horizontal control can be accomplished by means of potentiometer R6. Since steering in many games is of the on/off type, it is more easily accomplished on an exercise bicycle by means of push-button switches left and right mounted on the handlebar. The wiper of the potentiometer is shorted to the pin connected to the computer through analog switch U2C. With the potentiometer in its middle position, a resistance equal to that of a joystick in its middle position is detected by the computer. Resistor R3 is used to make U2C on. Pressing the right button grounds the input to U2C and the computer detects the entire resistance of the potentiometer. Pressing the left button turns U2B off and U2D on, connecting R2 in parallel with potentiometer R6. The resistance of R2 is about equal to the minimum resistance of a real joystick. Switch SW1 is used for selecting whether the resistance of the potentiometer R6, or the resistance of an external joystick, is connected to the computer. An external joystick is practical for use with the game menus. It also makes it possible to equip the exercise bicycle with a turning handlebar. Switches A and B correspond to the switches in joysticks which are used e.g. for shifting to a higher or a lower gear.

If implemented in this fashion, the invention provides numerous advantages, such as:

Compatibility with existing computers. An industry standard architecture computer can be used for other purposes apart from playing games.

Compatibility with existing game software. If the same games can be used with an ordinary joystick, the quality and quantity are better and the price is lower than with games that have to be produced for the exercise bicycle alone.

Can be manufactured as a modification kit that can be installed by the user. Because of their dedicated electronics or their turning handlebars, the earlier devices in the art are so complex that they can not be delivered as a modification kit that can be installed by the end-user. The present invention can easily be installed by the user.

Maintains motivation. Motivation during each session is created by the excitement and varying situations of the competition. Day-to-day motivation is maintained by improving results: the user's times and standings improve, he/she can pedal against greater stress. Year-to-year motivation is maintained by varying, continually improving game titles.

A turning handlebar is not necessary. The joysticks of industry standard architecture computers comprise two continuously variable resistances. Even in this environment, an on/off type steering is sometimes better than a linear steering. Several games (e.g. Stunt Car Racing) treat the joystick like the arrow keys of the computer. They only detect three horizontal positions of the joystick: left, middle and right. The conversion from on/off to continuously variable steering is performed in a clever way: when the player turns left or right the program "turns the steering wheel". As the player releases the joystick, the steering wheel returns towards its middle position at a certain speed. The player steers through a gentle curve by pressing a steering button part of the time. An attempt to control a game like this with a turning handlebar is definitely unsuccessful. A small movement of the handlebar produces no effect. Only movements above a certain threshold affect the steering wheel; once this happens, however, it does not matter whether the threshold is exceeded just barely or by a wide margin.

A separate brake is not needed. The two states of the exercise bicycle (idling or pedaling) are converted to the three states (braking, coasting, acceleration) required by racing simulations without a separate brake.

Steering is easily switched over to an external joystick. An external joystick is needed for two reasons:

1. For calibration of the exercise bicycle. The first action required by most racing simulations is calibrating the joystick. If this is done by pedaling the exercise bicycle, the calibration varies from one session to the next as it is difficult to pedal the bicycle at exactly the same speed each time. This causes the driving feel to vary between sessions and makes it difficult to succeed in races. A better driving feel is accomplished by calibrating the system with an external joystick permitting the middle and extreme positions to be repeated from one session to the next.

2. For choosing between game options. A joystick is also used to select racetracks, tuning the car, etc. With a vertical menu, choosing options with the exercise bicycle is not possible. Therefore, an easy way of connecting an external joystick is necessary.

The above is only one of the many possible embodiments of the present invention. The electronics can be analog or digital. The commercial implementation can be a conversion kit for adapting existing equipment or the invention can be included as part of a complete fitness device.

I claim:

1. A computer adapter apparatus for connecting a computer or video game system to an exercise bicycle, having two states such as idling and pedaling, said apparatus comprising:

input means for receiving input signals indicating the rate of physical exercise performed by a user of the exercise bicycle;

output means for communicating with a computer or video game system having an interface for a joystick, via that joystick interface; and converter means for driving said output means; said converter means comprising an element having a resistance which varies in response to said input signal; said converter means being arranged for converting said two states of said exercise bicycle into three states of computer gaming, braking, coasting and acceleration, respectively corresponding to rear, middle and forwards positions of the joystick;

said converter element being non-linear, in such a way that:

input signals indicating pedaling said exercise bicycle at speeds lower than a certain cross-over value are converted to a resistance higher than the resistance of a joystick in its middle position, such resistance being equivalent to pulling the joystick backwards, input signals indicating pedaling the exercise bicycle at a speed equal to this cross-over value are converted to a resistance equal to the resistance of a joystick in its middle position, and input signals indicating pedaling the exercise bicycle at speeds higher than a certain cross-over value are converted to a resistance lower than the resistance of a joystick in its middle position, such resistance being equivalent to pushing the joystick forwards said converter means being configured such that the maximum speed of the exercise bicycle is a speed at which the apparatus outputs a resistance which is equal to the resistance of said joystick when said joystick is pushed fully forward; and the cross-over speed at which the apparatus outputs a resistance equal to the resistance of a joystick in its middle position being less than one half of the maximum speed, making less than one half of the range of possible pedaling speeds equivalent to various degrees of braking and more than one half of the range of possible pedaling speeds equivalent to various degrees of acceleration.

2. The apparatus of claim 1 wherein:

said converter means comprises a light-dependent resistor illuminated by illuminating means, such the current passing through said illuminating means is responsive to the pedaling speed of said exercise bicycle.

3. The apparatus of claim 1 wherein:

said converter means comprises a pulse input sensor, a timer, a low-pass filter, an illuminating means and a light dependent resistor, all operatively associated with one another.

4. The apparatus of claim 1 wherein:

said non-linear element comprises a counter means arranged for counting clock pulses during a revolution of a rotational element of said exercise bicycle, and for selecting a matching resistance from a series of resistances.

5. The apparatus of claim 1 wherein:

said non-linear element comprises a counter means arranged for counting pulses from a rotational element of said exercise bicycle for a certain times and for selecting a matching resistance from a series of resistances.

6. A method of controlling software by performance of physical exercise with fitness equipment, said software being operable for executing in a computer comprising a joystick port and being responsive in a substantially continuously variable way to signals applied to said joystick port, said method comprising the following steps:

executing said software in said computer;

receiving input signals from said fitness equipment, said input signals indicating the rate of physical exercise performed by the user of said fitness equipment;

converting said input signals to output signals which correspond to signals from a joystick when connected to said computer, and applying said output signals to said joystick port, wherein input signals lower than a predetermined threshold value are converted to output signals corresponding to signals from said joystick pulled backwards and input signals higher than said threshold value are converted to output signals corresponding to signals from said joystick pushed forward, whereby software responsive to joystick input can be controlled with fitness equipment without modifications to said software.

7. An adapter apparatus for connecting a computer or video game system to fitness equipment, such as an exercise bicycle, the computer or video game system comprising an interface for a joystick which is capable of being pulled backwards and pushed forwards and thereby producing respective joystick signals, said apparatus comprising:

input means arranged for receiving an input signal indicating the rate of physical exercise performed by a user of the fitness equipment; and converter means, responsive to the input means, for producing output signals corresponding to joystick said respective joystick signals, such that an input signal respectively indicating a low or high rate of physical exercise is respectively converted to an output signal corresponding to the joystick respectively being pulled backwards of pushed forwards, whereby software responsive to said joystick signals can be controlled from said fitness equipment without modifications to said software.

8. The adapter apparatus of claim 7, wherein:

said converter means comprises an element arranged for converting idling and exercising states of the exercise equipment into braking, coasting and acceleration states useful for playing a computer game.

9. The adapter apparatus of claim 8, wherein:

said converter means is non-linear, in such a way that a similar change in the rate of physical exercise by the user causes a smaller change in the output signal at higher rats of exercise than at lower rates of exercise.

10. The adapter apparatus of any one of the claims 7–9, wherein:

said converter means comprises a light-dependent resistor illuminated by illuminating means, such that current passing through said illuminating means is responsive to the speed of operation by the user of said exercise equipment.

11. The adapter apparatus of claim 1, wherein:

said converter means comprises a pulse input sensor, a timer, a low-pass filter, an illuminating means and a light dependent resistor, all operatively associated with one another.

12. The adapter apparatus of claim 1, wherein:

said non-linear element comprises a counter means arranged for counting clock pulses during a repetitive movement of said fitness equipment, and selecting means for selecting a matching resistance from series of resistances.

13. The adapter apparatus of claim 1, wherein:

said non-linear element comprises a counter means arranged for counting pulses from an element of the fitness equipment performing repetitive movement for a predetermined time, and selecting means for selecting a matching resistance from a series of resistances.

* * * * *